US008874733B2

(12) United States Patent
Mitchell et al.

(10) Patent No.: US 8,874,733 B2
(45) Date of Patent: Oct. 28, 2014

(54) PROVIDING SERVER PERFORMANCE DECISION SUPPORT

(75) Inventors: Kent Mitchell, Denver, CO (US); Jason Heintz, Centennial, CO (US); Hollie McCurdy, Seattle, WA (US); Carroll Moon, Alta Vista, VA (US); Mark Miller, Flower Mound, TX (US); Brian Feck, Charlotte, NC (US); Lou Nikodym, Golden, CO (US)

(73) Assignee: Microsoft Corporation, Redmond, WA (US)

( * ) Notice: Subject to any disclaimer, the term of this patent is extended or adjusted under 35 U.S.C. 154(b) by 282 days.

(21) Appl. No.: 13/325,883

(22) Filed: Dec. 14, 2011

(65) Prior Publication Data

US 2013/0159493 A1 Jun. 20, 2013

(51) Int. Cl.
*G06F 15/173* (2006.01)
(52) U.S. Cl.
USPC .......................................... 709/224; 709/229
(58) Field of Classification Search
None
See application file for complete search history.

(56) References Cited

U.S. PATENT DOCUMENTS

| 6,557,035 | B1 | 4/2003 | McKnight | |
|---|---|---|---|---|
| 7,870,244 | B2 | 1/2011 | Chong et al. | |
| 2011/0131335 | A1* | 6/2011 | Spaltro et al. | 709/228 |
| 2012/0089562 | A1* | 4/2012 | Deremigio et al. | 707/602 |
| 2012/0173709 | A1* | 7/2012 | Li et al. | 709/224 |

OTHER PUBLICATIONS

"How about 'Predictive Analytics' for IT System failure alerts, before they actually happen?", Retrieved at <<http://www.excitingip.com/2485/how-about-predictive-analytics-for-it-system-failure-alerts-before-they-actually-happen/>>, Retrieved Date: Sep. 30, 2011, pp. 1-3.
"Netuitive's Behavior Learning Engine", Retrieved at <<http://www.netuitive.com/products/behavior-learning-engine.html>>, Retrieved Date: Sep. 30, 2011, pp. 1-4.
Khan, et al., "Workload Characterization and Prediction in the Cloud: A Multiple Time Series Approach", Retrieved at <<http://www.cs.ucsb.edu/~arijitkhan/Papers/multiple_timeseries_prediction.pdf>>, Proceedings of International Conference on Management of Data (SIGMOD), Retrieved Date: Sep. 26, 2011, pp. 1-14.
Marshall, David, "CopperEgg Launches RevealCloud Pro Bringing Comprehensive Performance Analytics to the Cloud", Retrieved at <<http://vmblog.com/archive/2011/09/12/copperegg-launches-revealcloud-pro-bringing-comprehensive-performance-analytics-to-the-cloud.aspx>>, Retrieved Date: Sep. 12, 2011, pp. 1-7.
"Unix System Monitoring", Retrieved at <<http://www.softpanorama.org/Admin/system_monitoring.shtml>>, Jul. 2004, pp. 1-33.
"SQL, DBA, MySql, Oracle Services", Retrieved at <<http://dba-24x7.blogspot.com/>>, Retrieved Date: Sep. 30, 2011, pp. 1-8.

* cited by examiner

*Primary Examiner* — Mohamed Ibrahim
(74) *Attorney, Agent, or Firm* — Louise Bowman; Jim Ross; Micky Minhas

(57) ABSTRACT

An application provides server performance decision support to end-users. The application monitors the transaction data of servers. The transaction data includes network communications as well as server specific information such as resource utilization. The application captures a sample of the transaction data. The captured sample can be random or predetermined. The sample is limited in length according to a preset time value. The application analyzes the sample to determine performance metrics for the server. The application presents the performance metrics within a business intelligence data structure to enable an end-user to data mine the performance metrics according to additional variables.

20 Claims, 7 Drawing Sheets

PROVIDING SERVER PERFORMANCE DECISION SUPPORT

BACKGROUND

Distributed computing technologies have enabled multiple computing resources to provide coordinated or distinct solutions. An example of distributed computing, cloud computing brings together multiple systems to provide solutions to user needs. Cloud computing can span a vast array of computing resources. The computing resources utilized in cloud computing applications may be dispersed across networks and locations. Dispersed computing resources are remotely controlled and managed. Usually, automated systems monitor and troubleshoot problems associated with dispersed computing resources. Manual troubleshooting by human components of widely dispersed computing resources is not cost effective.

Conventional monitoring solutions for cloud computing systems performance have limitations. The amount of data generated by cloud computing systems is vast. Computing power necessary to analyze and produce performance metrics from the data is equally large. Conventional solutions typically rely on threshold based implementations. Such implementations are usually inflexible and rarely meet customer demands for redirecting servers to other purposes. Current monitoring implementations also frequently require human intervention to configure parameters and other values to maintain normalized operations. Additionally, data mining and other end-user based post-analysis needs are rarely met by current approaches.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to server performance monitoring in very large scale cloud computing environments. According to some embodiments, an application may provide server performance decision support. The application may monitor transaction data of one or more servers. The transaction data may include communications data, performance parameters, etc. The application may capture a sample of the transaction data of the monitored server(s). The sample may be limited according to a preset time value. The application may analyze the sample to determine performance metrics for the monitored server(s). Performance metrics may include resource availability. The application may present the performance metrics within a business intelligence data structure, which may provide analyzed performance data according to multiple variables. An example may be an online analytical processing (OLAP) cube presenting performance metrics according to multiple parameters such as resources, utilization, etc.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
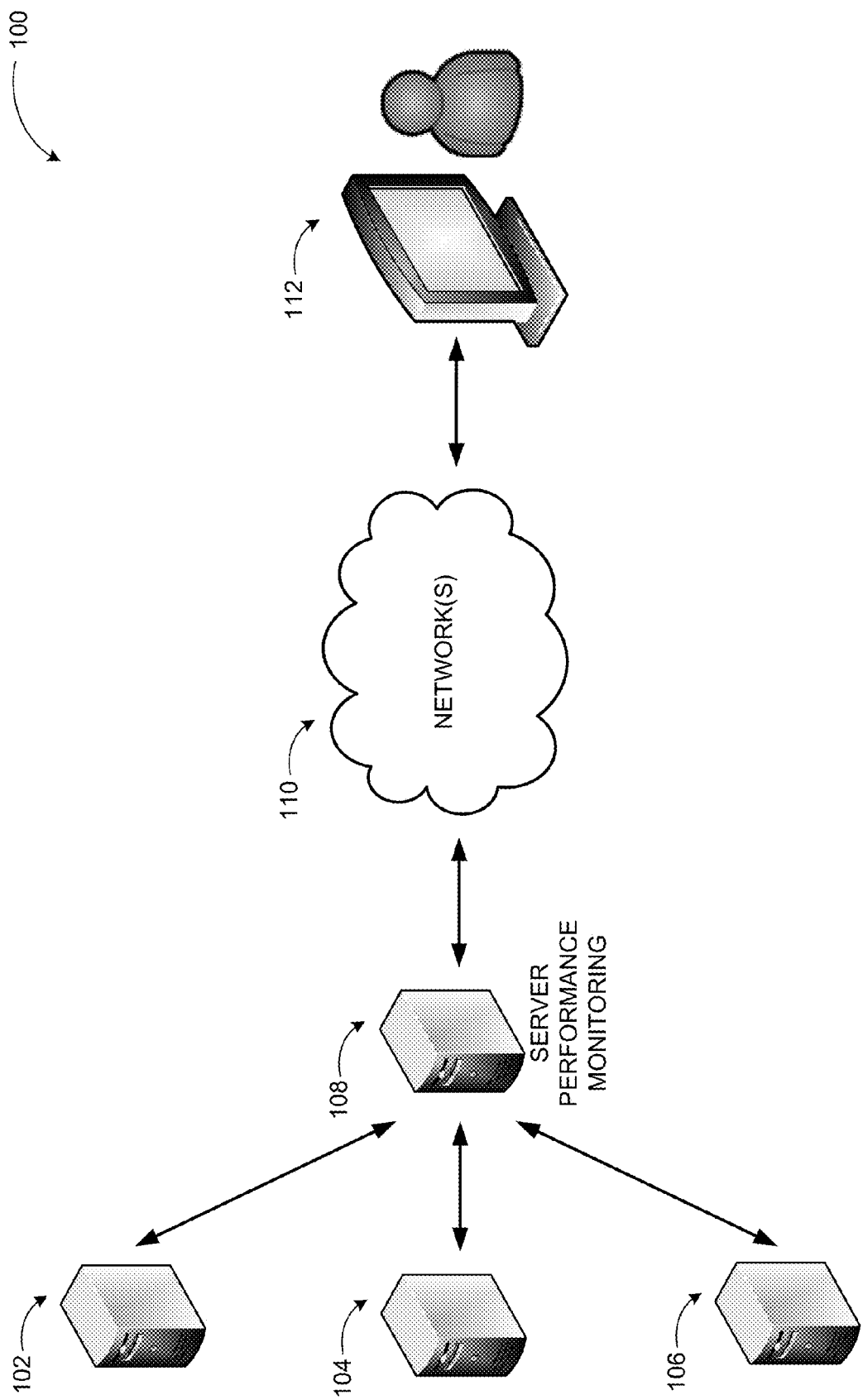
FIG. 1 illustrates an example conceptual network diagram of a system providing server performance decision support.

As briefly described above, an application may provide server performance decision support. The application may monitor transaction data of a server. The server may be a remote or a local server providing a variety of services. The application may have access to server specific transactions such as performance parameters or access to network traffic of the server. The application may capture a sample of the transaction data of the server. The sample may be a grain of the transaction data limited according to a preset length of the grain. The application may analyze the sample to determine performance metrics for the server. The application may employ deterministic algorithms to detect server behavior from the analysis. Next the application may present the performance metrics within a business intelligence data structure. The application may provide the performance metrics according to analyzed variables in a structure best suited to present multiple variable based data analysis.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

According to embodiments, an application may monitor servers for performance data. Performance data may encompass variety of server operations including resource utilization, availability, consumption, and/or predictable events. The application may reside within a full system embodied by a monitoring server executing the application. Alternatively, the application may execute as a part of a monitoring platform running within the monitored server. Yet in other embodiments, the application may be a distributed application having components reside in monitored servers as well as in analysis servers. In other embodiments, the application may monitor local servers within a local network and remote servers outside the local network.

FIG. 1 illustrates an example conceptual network diagram of a system providing server performance decision support. Diagram 100 displays network components interacting with an application monitoring performance of other servers. The application may run in a server performance monitoring server 108. The performance monitoring server 108 may monitor transaction data of multiple servers 102, 104, and 106. The servers 102, 104, and 106 may be part of group of servers providing a service such as data management. Alternatively, the servers 102, 104, and 106 may be independent and provide variety of services to end-users or other applications and servers.

The application may capture and analyze the transaction data of servers 102, 104, and 106 within performance monitoring server 108. The analysis may be performed through variety of business intelligence methods including multiple variable analyses of performance data. The application of performance monitoring server 108 may produce performance metrics upon the conclusion of the analysis and present the performance metrics for consumption. An end-user 112 may retrieve the performance metrics by accessing the application of performance monitoring server 108 through network(s) 110.

Figure 2:
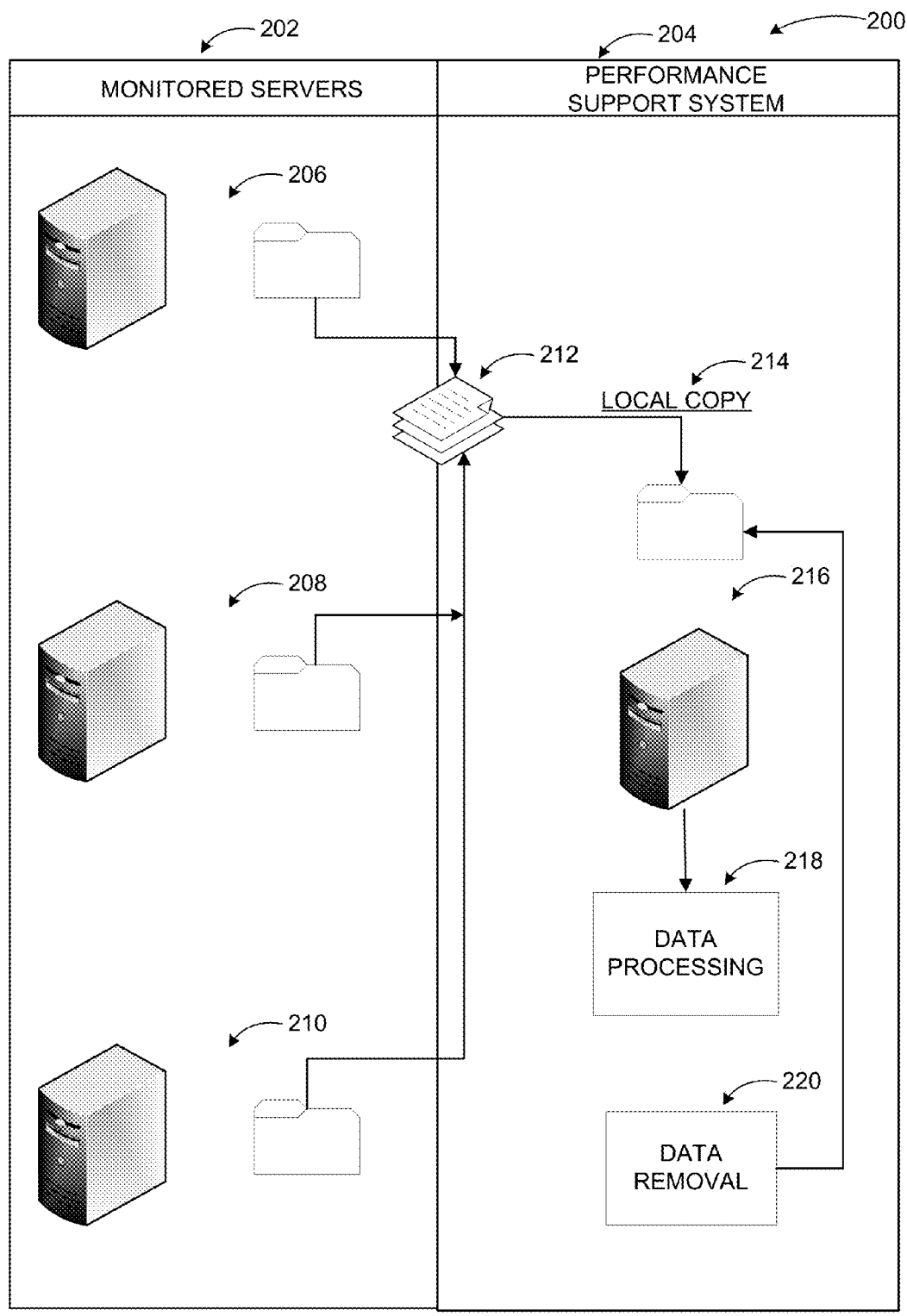
FIG. 2 illustrates example components of a system providing server performance decision support according to embodiments.

FIG. 2 illustrates example components of a system providing server performance decision support according to embodiments. Diagram 200 displays components of monitored servers 202 and performance support system 204. In an embodiment, an application running on performance monitoring server 216 may monitor transaction data 212 for servers 206, 208, and 210. The transaction data 212 may include a range of information such as server specific performance parameters, resource utilization, etc. An example may be network bandwidth utilization of a server. The transaction data 212 may be sampled by an application of performance monitoring server 216 and stored in a local copy 214. The sample may be randomly selected. An example may be retrieval of increments of the transaction data 212 at random time points. Alternatively, the sample may be selected according to a predetermined scheme. An example may be retrieval of a grain of the transaction data according to a specified capture range. A grain may be captured transaction data through a set time range.

Subsequently, the application executed on the performance monitoring server 216 may analyze the sample of the transaction data stored in local copy 214 through data processing 218. The local copy 214 may be a data store. The data store may be temporary such as a cached data store. Alternatively, the data store may be persistent. Data processing 218 may generate performance metrics from the transaction data and store the performance metrics in a business intelligence data structure to enable subsequent data mining. An example business intelligence data structure may be a pivot table organizing the performance metrics according to multiple variables. Upon conclusion of the analysis, the application may employ a data removal process 220 to remove sample transaction data from local copy 214. An example of removed data may be sample data with an expiration value. Upon reaching the expiration time, the application may remove the sample data from the local copy 214.

According to an example embodiment, the application may utilize Structured Query Language (SQL) analysis services of the performance monitoring server 216 to generate high performance queries. High performance queries may analyze the sample of the transaction data according to scalable algorithms to meet demand for performance metrics. The application may provide self-service business intelligence to end-users through the high performance queries. In an example, the performance metrics may be generated on the fly upon business intelligence needs of the end-user. The application may tailor production of the performance metrics according to analysis parameters provided by the end-users.

According to another example embodiment, the application may group a monitored server with others according to an operations category. The categories may include a service, a role, or similar ones. The application may analyze the sample using additional control management business logic associated with the operations category of the server. In an example scenario, the application may apply different parameters to performance metrics analysis according to an operation category of a server having a mission critical role. An example may be lowered responsiveness parameters for a mission critical server compared to a server belonging to a data center based service operations category. The additional control management business logic may employ algorithms tailored to measure performance metrics associated with the operations category.

According to further embodiments, the application may execute an in-depth data mining analysis to determine the performance metrics. An in-depth data analysis may scrutinize the transaction data to compare one or more performance metrics against a predetermined normal server behavior range to determine an operational status of the server. The operational status may include a normal operation and an abnormal operation. Alternatively, the application may predict a resource depletion event by comparing one or more server utilization servers retrieved from the performance metrics against a predetermined threshold value. The application may trigger a messaging process to alert (about the resource depletion event) a responsive entity associated with the resource depletion event. The responsive entity may be an end-user, a monitoring server, and another application.

According to yet other embodiments, the application may determine key server performance issues from the performance metrics. The key performance issues may indicate an underperforming server according to preset performance values. Conversely, the key performance issues may also enable discovery of an underutilized server or groups of servers, indicating an opportunity for virtualization as an improvement in efficiency, saving cost and energy resources. The application may present the key server performance issues through a reporting service for cloud computing analysis. Cloud computing analysis may assess and take corrective action to improve the health of the cloud computing. The key server performance issues may include a server health analysis, a server performance analysis, or a server resource analysis.

Figure 3:
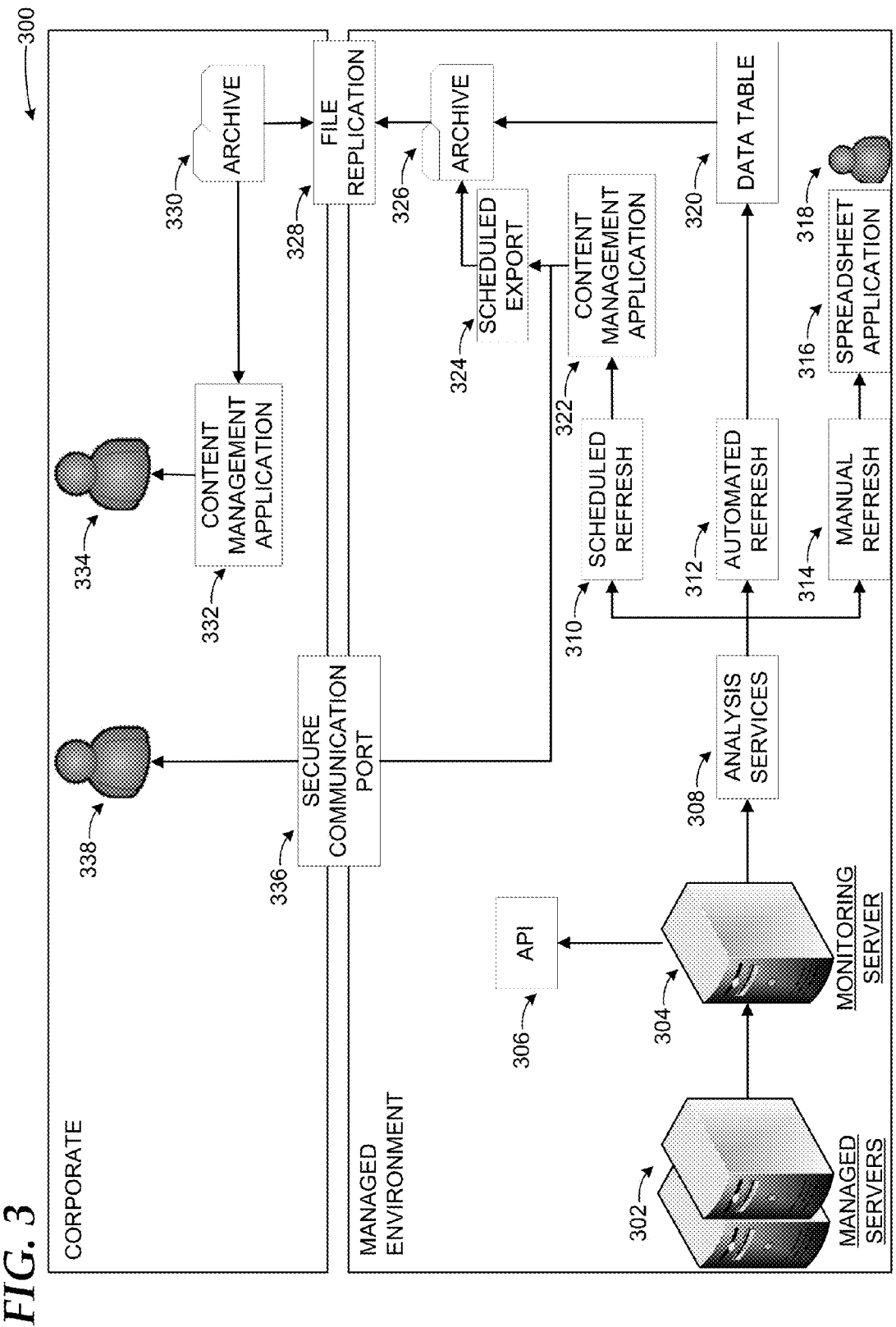
FIG. 3 illustrates other example components of the system providing server performance decision support according to embodiments.

FIG. 3 illustrates other example components of the system providing server performance decision support according to embodiments. Diagram 300 displays a performance monitoring server 304 in a managed environment executing an application monitoring managed servers 302. The application may have an application programming interface (API) 306 to enable access to the application's internal components for external applications. The application may process the captured sample of the server transaction data through analysis services 308. The analysis services 308 may be refreshed according to a consuming application. A spreadsheet application 316 presenting the performance metrics to an end-user 318 may manually refresh 314 the analysis services 308 upon demand of the end-user.

Alternatively, a content management application 322 may implement a scheduled refresh 310 to retrieve performance metrics from the analysis services 308. The content management application 322 may present the performance metrics to an end-user 338 in a corporate or other separate environment through secure communications using secure communication port 336. Additionally the content management application may transmit the performance metrics to an archive 326 through a scheduled export process 324.

According to an embodiment, the performance metrics produced as result of the analysis services 308 may be stored at an intermediary data table 320. The stored performance metrics may be refreshed automatically 312. The performance metrics may be transmitted to an archive 326 from the data table 320. The archive 326 may be replicated through a file replication process 328 and a local copy may be stored in an archive 330 within the corporate or other separate environment. Another content management application 332 may access the archive 330 and present performance metrics to another end-user 334.

According to another embodiment, the application may employ a star schema utilizing key dimensions to analyze the sample. The key dimensions may include objects, counters, and instances of the performance metrics. Additionally, the application may provide aggregation and report design functionality for the performance metrics to the end-users through utilization of the key dimensions. An example may be aggregating performance metrics according to an instance of the performance metric such as maximum memory utilization, or by server categorization or classification algorithms such that servers are grouped together with other like servers.

According to some embodiments, the business intelligence data structure may be an online analytical processing (OLAP) cube or a pivot table. Either structure may provide analyzed data grouped according to multiple variables.

According to further embodiments, the application may capture a grain as a sample of the transaction data. The grain may be captured according to the length of the grain. The length of the grain may be a predetermined number of seconds, a predetermined number of minutes, and a predetermined number of hours. The application may retain the grain for a predetermined time period associated with the length of the grain. An example may be retaining a grain under 60 seconds for a number of days, a grain between 1 and 60 minutes for number of weeks, and a grain between 1 and multiple hours for number of months. Additionally, the application may provide historical trend analysis for the performance metrics determined from the retained grain. The application may display trend reports by analyzing the changes in a monitored performance metric determined from the retained grain.

Figure 4:
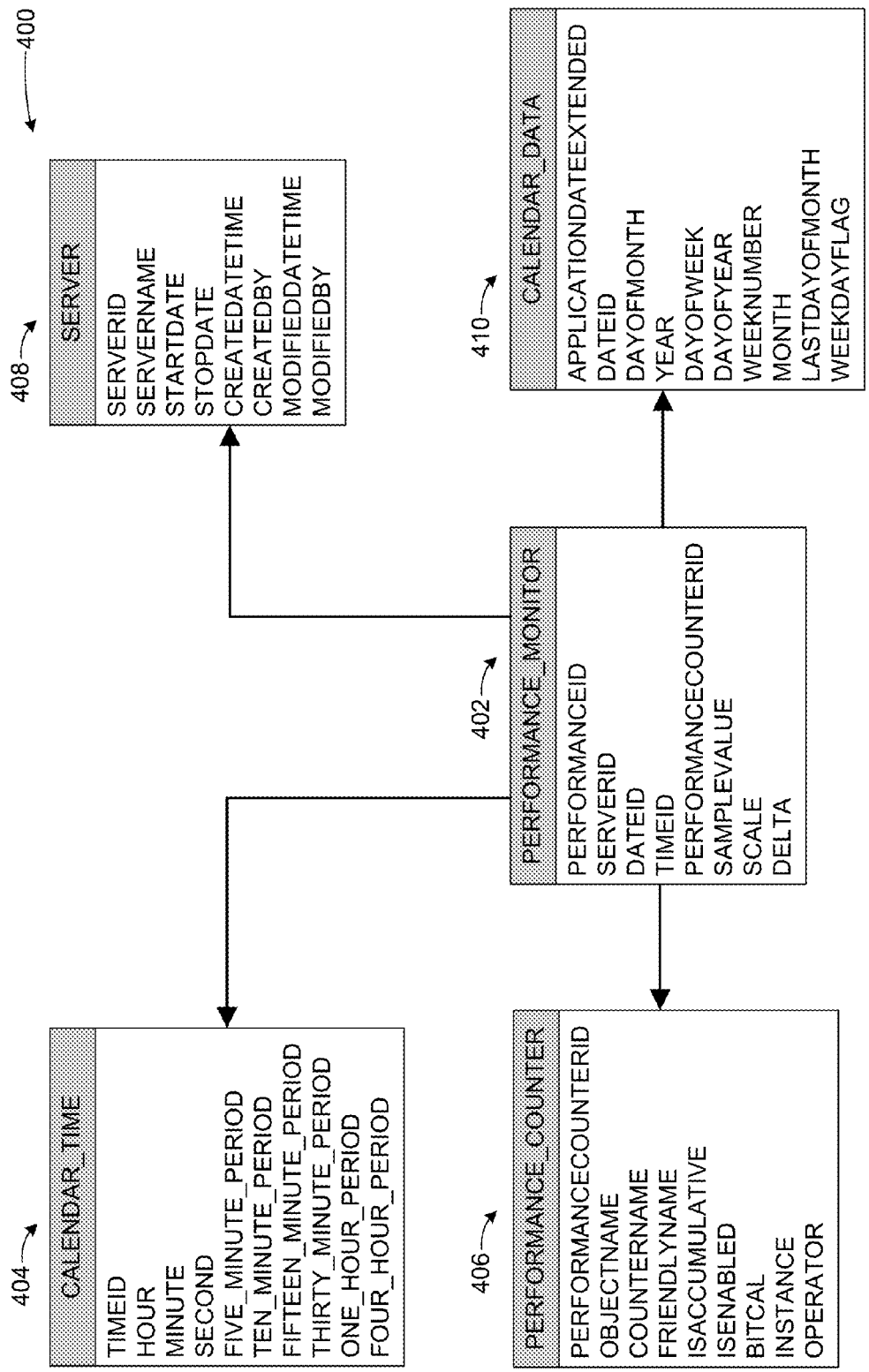
FIG. 4 illustrates an example data schema of a system providing server performance decision support according to embodiments.

FIG. 4 illustrates example data schema of a system providing server performance decision support according to embodiments. Diagram 400 displays example data tables of the data schema utilized by the application.

A data schema according to embodiments may, for example, have a "PERFORMANCE_MONITOR" table 402 to relate performance metrics values to each other. A "SERVER" table 408 may store values to identify the monitored server. A "CALENDAR_TIME" table 404 may store date time information about the timing and length of the sample of the transaction data. A "PERFORMANCE_COUNTER" table 406 may store values about the performance metric. A "CALENDAR_DATA" table 410 may store time stamp information defining preset values for time ranges to be used during sample analysis to produce performance metrics.

Various configurations, data structures, server roles, and interactions are used in FIG. 1 through FIG. 4 to describe example embodiments. The examples are for illustration purposes, and embodiments are not limited to those. Different aspects of the presented disclosure may be implemented using other configurations, servers, interactions, and data structures using the principles described herein.

Figure 5:
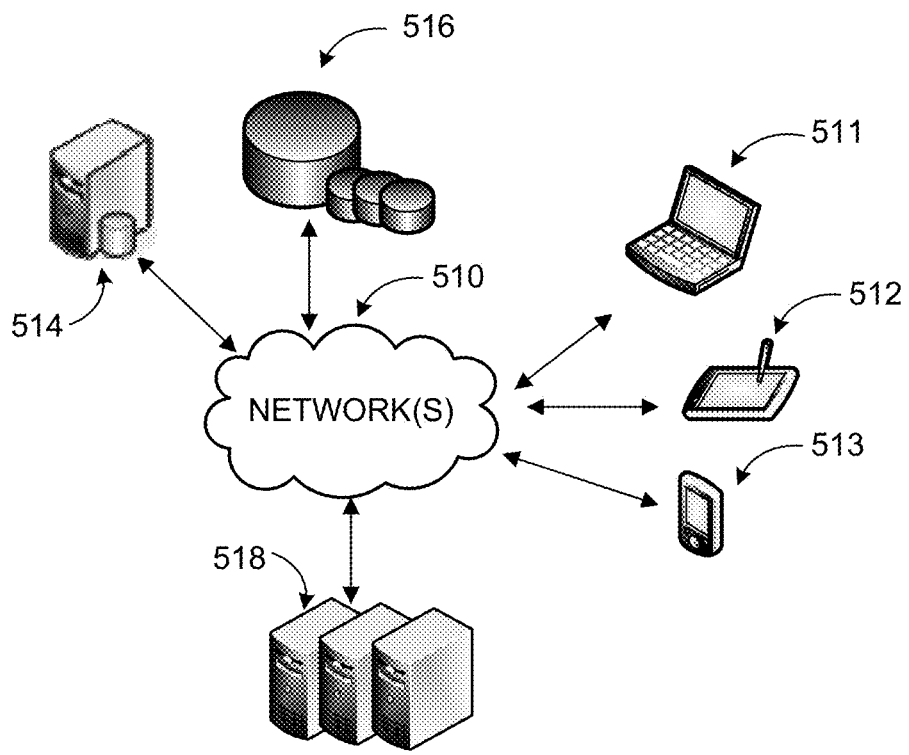
FIG. 5 is a networked environment, where a system according to embodiments may be implemented.

FIG. 5 is a networked environment, where a system according to embodiments may be implemented. In addition to locally installed applications, such as application 622 discussed below, providing server performance decision support may be also be employed in conjunction with hosted applications and services that may be implemented via software executed over one or more servers 518 or an individual server. A hosted service or application may communicate with client applications on individual computing devices such as a handheld computer, a desktop computer, a laptop computer 511, a tablet computer 512 (or slate), a smart phone 513, ('client devices') through network(s) 510 and provide server performance decision support.

As previously discussed, server performance decision support may be provided by the hosted service or application. The performance metrics may be analyzed from a grain or sample of the server transaction data.

Client devices 511-513 are used to access the functionality provided by the hosted service or application. One or more of the servers 518 or a server may be used to provide a variety of services as discussed above. Relevant data may be stored in one or more data stores (e.g. data store 514), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to provide server performance decision support. Furthermore, the networked environments discussed in FIG. 5 are for illustration purposes only. Embodiments are not limited to the example applications, modules, or processes.

Figure 6:
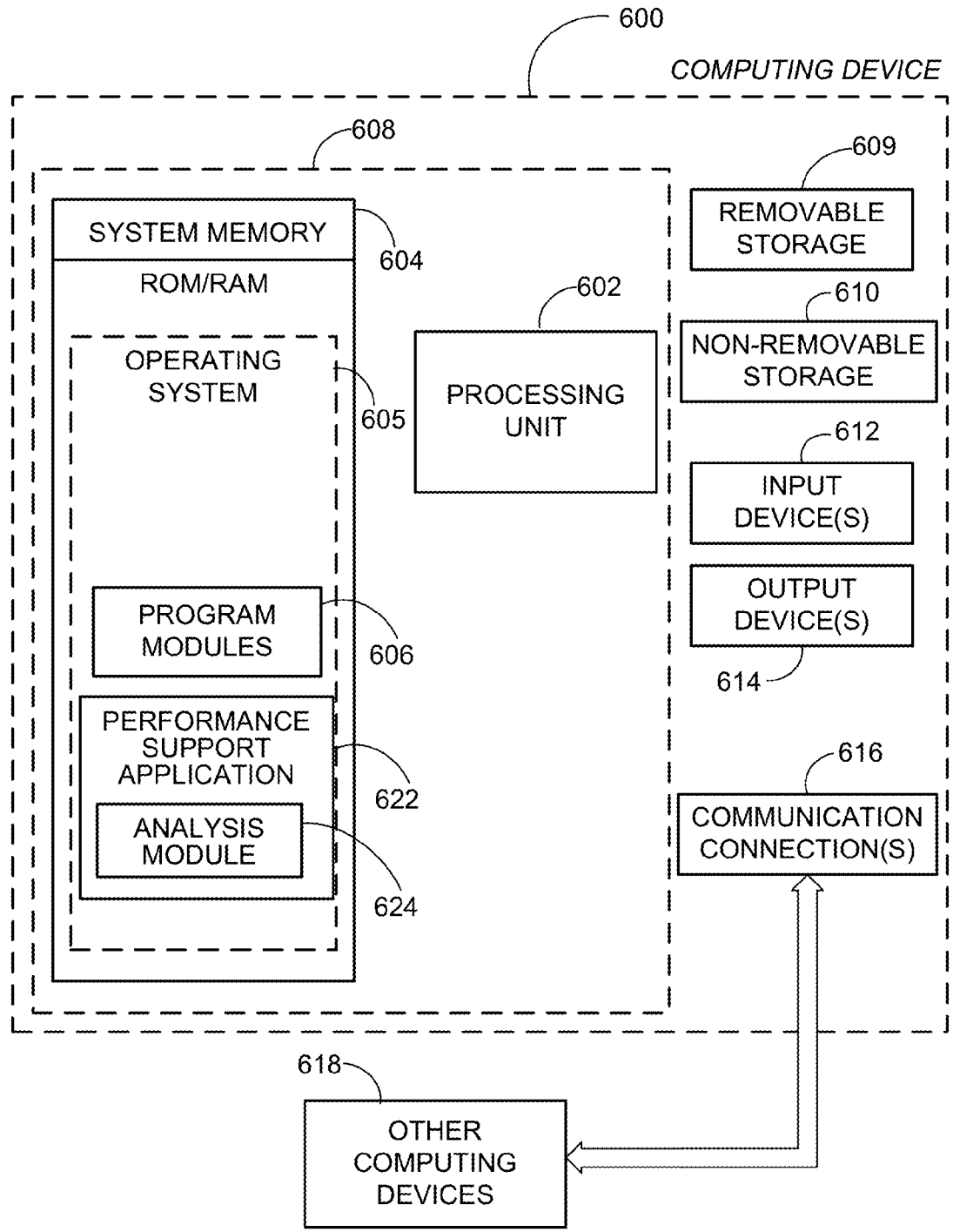
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment according to embodiments is illustrated, such as computing device 600. In a basic configuration, computing device 600 may be any monitoring device in stationary, mobile, or other form such as the example devices discussed in conjunction with FIG. 1, and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating system from MICROSOFT CORPORATION of Redmond, Wash. The system memory 604 may also include one or more software applications such as program modules 606, performance support application 622, and analysis module 624.

Analysis module 624 may operate in conjunction with the operating system 605 or performance support application 622 and provide performance metrics as discussed previously. Analysis module 624 may also enable self-service business intelligence by providing the performance metrics in end-user configurable business intelligence data structures. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, an optical capture device for detecting gestures, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, other directory or policy servers, and comparable devices.

Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
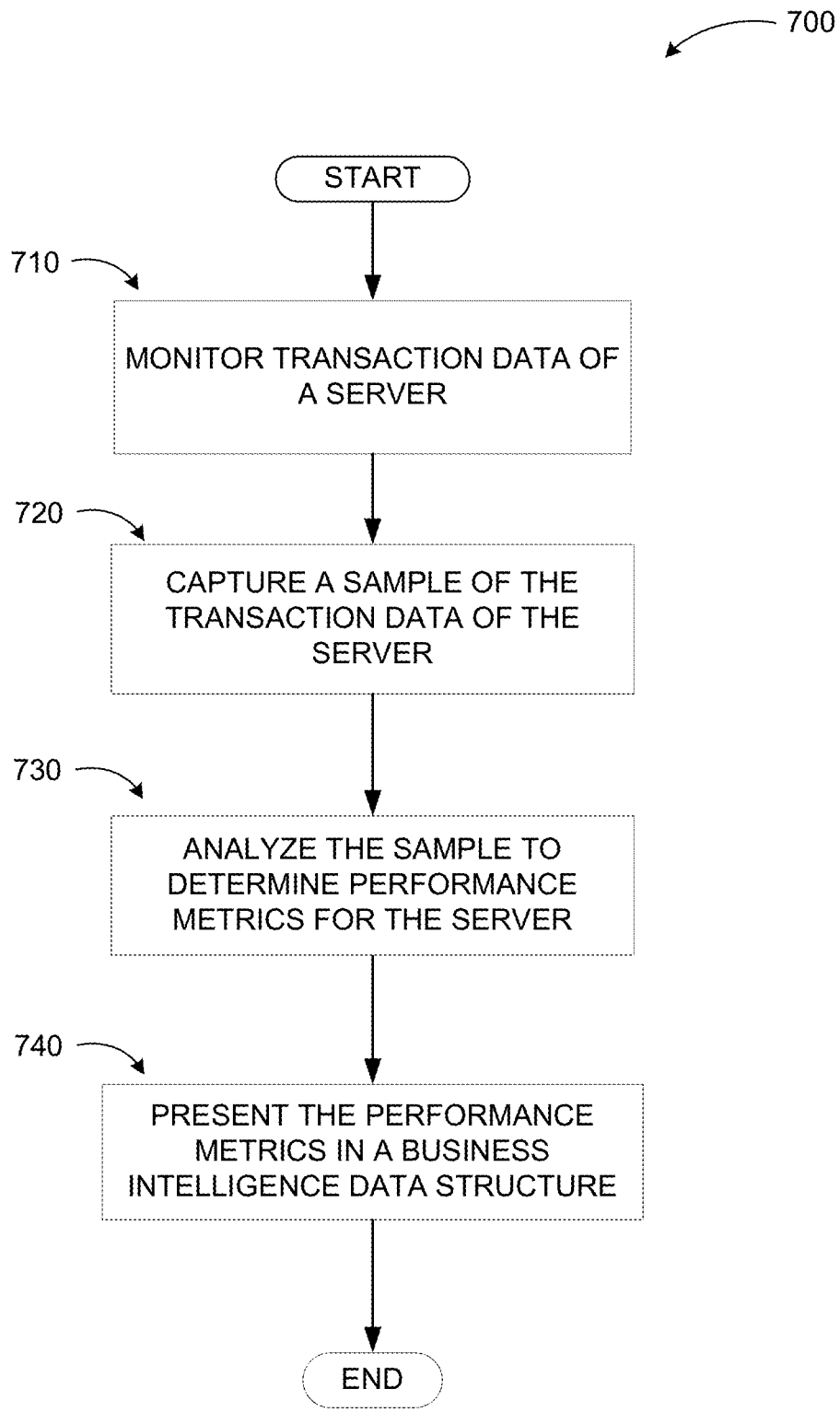
FIG. 7 illustrates a logic flow diagram for a process of providing server performance decision support according to embodiments.

FIG. 7 illustrates a logic flow diagram for a process of providing server performance decision support according to embodiments. Process 700 may be implemented as part of an application or an operating system of any computing device capable of capturing a sample of server transaction data.

Process 700 begins with operation 710, where an application may monitor transaction data of a server. The server may be grouped to an operational category with other servers according to a service, a role, or similar aspects. Subsequently, the application may capture a sample of the transaction data of the server at operation 720. The sample may be a grain of the transaction data captured according to a length of the grain. The grain length may be a predetermined time value. Next, the application may analyze the sample to determine performance metrics for the server at operation 730. The performance metrics may include resource consumption, resource availability, server health, etc. At operation 740, the application may present the performance metrics in a business intelligence data structure. The business intelligence data structure may be an OLAP cube, a pivot table, or similar data structure enabling an end-user to analyze the performance metrics according to multiple variables.

The operations included in process 700 are for illustration purposes. Providing server performance decision support according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing server performance decision support, the method comprising:
   monitoring transaction data of a server;
   capturing a sample of the transaction data of the server according to a predetermined scheme;
   analyzing the captured sample to determine performance metrics for the server, wherein lowered responsiveness parameters are applied to the performance metrics for the server in response to a determination that the server has a mission critical role; and
   presenting the performance metrics in a business intelligence data structure.

2. The method of claim 1, wherein analyzing the captured sample comprises:
   executing an in-depth data mining analysis to determine the performance metrics.

3. The method of claim 2, further comprising:
   predicting a resource depletion event by comparing at least one server utilization metric from the performance metrics against a predetermined threshold value.

4. The method of claim 3, further comprising:
   triggering a messaging process to alert a responsive entity associated with the resource depletion event, the responsive entity including at least one from a set of: an end-user, a monitoring server, and another application about the resource depletion event.

5. The method of claim 2, further comprising:
   comparing at least one server behavior metric from the performance metrics against a predetermined normal server behavior range to determine an operational status of the server including at least one from a set of: a normal operation and an abnormal operation.

6. The method of claim 1, wherein analyzing the sample comprises:
   employing a data structure technology analysis to generate high performance queries; and
   analyzing the captured sample of the transaction data according to one or more scalable algorithms through the high performance queries.

7. The method of claim 6, further comprising:
   providing self-service business intelligence to end users through the high performance queries, wherein the performance metrics are generated dynamically based on at least one of a business intelligence need of an end user and according to one or more analysis parameters provided by the end user.

8. The method of claim 1, further comprising:
   determining key server performance issues from the performance metrics; and
   presenting the key server performance issues through a reporting service for cloud computing analysis.

9. The method of claim 8, wherein the key server performance issues include at least one from a set of: a server health analysis, a server performance analysis, and a server resource analysis for the server.

10. The method of claim 1, further comprising:
    grouping the server with one or more other servers according to an operations category including at least one of: a service and a role; and
    analyzing the captured sample using additional control management business logic associated with the operations category of the server.

11. A computing device for providing server performance decision support, the computing device comprising:
    a memory;
    a processor coupled to the memory, the processor executing an application and causing services associated with the application to analyze server performance, wherein the processor is configured to:
    monitor transaction data of a server;
    capture a sample of the transaction data of the server;
    analyze the sample to determine performance metrics for the server by:
       applying lowered responsiveness parameters to the performance metrics for the server in response to a determination that the server has a mission critical role;
       aggregating performance metrics based on instances of algorithms measuring the performance metrics, wherein the algorithms include one or more from a set of: a maximum memory utilization algorithm, a server categorization algorithm, and a server classification algorithm;
       employing a data-structure technology analysis to generate high performance queries; and
       providing self-service business intelligence for managing server performance monitoring to end users through the high performance queries;
    determine key server performance issues from the performance metrics of the server, wherein the key performance issues indicate one or more underperforming servers or groups of servers based on a comparison of the performance metrics against predetermined threshold values;
    in response to a determination that the one or more servers or groups of servers are underperforming, trigger a messaging process from the processor executing the application to alert a responsive entity associated with the one or more underperforming servers or groups of servers; and
    present the performance metrics in a business intelligence data structure.

12. The computing device of claim 11, wherein the processor is further configured to:
    employ a star schema utilizing key dimensions to analyze the sample.

13. The computing device of claim 12, wherein the key dimensions include at least one from a set of: objects, counters, and instances for the performance metrics.

14. The computing device of claim 12, wherein the processor is further configured to:
    provide aggregation and report design functionality for the performance metrics to the end users through utilization of the key dimensions.

15. The computing device of claim 11, wherein the business intelligence data structure is at least one from a set of: an online analytical processing (OLAP) cube and a pivot table.

16. The computing device of claim 11, wherein the server is one from a set of:
    a local server and a remote server.

17. A computer-readable memory device with instructions stored thereon for providing server performance decision support, the instructions comprising:
    monitoring transaction data of a server;
    capturing a grain of the transaction data of the server, wherein the grain is a sample of the transaction data captured according to a predefined length of the grain;
    analyzing the grain to determine performance metrics for the server by:
       applying lowered responsiveness parameters to the performance metrics for the server in response to a determination that the server has a mission critical role;
       aggregating performance metrics based on instances of algorithms measuring the performance metrics, wherein the algorithms include one or more from a set of: a maximum memory utilization algorithm, a server categorization algorithm, and a server classification algorithm;

utilizing a data-structure technology analysis to generate high performance queries; and providing self-service business intelligence to end users through the high performance queries;

determining key server performance issues from the performance metrics of the server, wherein the key performance issues indicate one or more underperforming servers or groups of servers based on a comparison of the performance metrics against predetermined threshold values;

in response to another determination that the one or more servers or groups of servers are underperforming, triggering a messaging process to alert a responsive entity associated with the one or more underperforming servers or groups of servers; and presenting the performance metrics in a business intelligence data structure.

18. The computer-readable memory device of claim 17, wherein the instructions further comprise:

retaining the grain for a predetermined time period based on the predefined length of the grain.

19. The computer-readable memory device of claim 18, wherein the instructions further comprise:

providing historical trend analysis for the performance metrics determined from the retained grain.

20. The computer-readable memory device of claim 17, wherein the instructions further comprise:

upon conclusion of the analysis, removing the captured grain of the transaction data based on one of the length of the grain and a predetermined expiration period.

* * * * *